United States Patent
Jing et al.

(10) Patent No.: US 9,941,792 B2
(45) Date of Patent: Apr. 10, 2018

(54) DC OFFSET CORRECTION FOR INDUCTOR CURRENT RIPPLE BASED, CONSTANT-ON-TIME DC-DC CONVERTERS

(71) Applicant: NXP B.V., Eindhoven (NL)

(72) Inventors: Yue Jing, Tempe, AZ (US); Ahmad Dashtestani, Scottsdale, AZ (US); Shufan Chan, Milpitas, CA (US)

(73) Assignee: NXP B.V., Eindhoven (NL)

( * ) Notice: Subject to any disclaimer, the term of this patent is extended or adjusted under 35 U.S.C. 154(b) by 18 days.

(21) Appl. No.: 15/088,661

(22) Filed: Apr. 1, 2016

(65) Prior Publication Data
US 2017/0288543 A1   Oct. 5, 2017

(51) Int. Cl.
*H02M 3/158*  (2006.01)
*H02M 1/08*  (2006.01)
*H02M 1/12*  (2006.01)
*H02M 1/00*  (2006.01)

(52) U.S. Cl.
CPC .......... *H02M 3/158* (2013.01); *H02M 1/08* (2013.01); *H02M 1/12* (2013.01); *H02M 2001/0009* (2013.01)

(58) Field of Classification Search
CPC . H02M 2001/0003; H02M 2001/0009; H02M 1/14; H02M 1/08; H02M 1/12; H02M 3/155; H02M 3/156; H02M 3/157; H02M 3/335; H02M 3/337
See application file for complete search history.

(56) References Cited

U.S. PATENT DOCUMENTS

| 5,602,465 A | 2/1997 | Clemente .................... 323/300 |
| 5,770,940 A | 6/1998 | Goder |
| 6,885,175 B2 | 4/2005 | Mihalka |

(Continued)

FOREIGN PATENT DOCUMENTS

| CN | 103576734 A | 2/2014 |
| JP | 2014018030 A | 1/2014 |

OTHER PUBLICATIONS

Lin, Yu-Cheng et al.; "A Ripple-Based Constant On-Time Control with Virtual Inductor Current and Offset Cancellation for DC Power Converters"; IEEE transactions on Power Electronics, vol. 27, No. 10; pp. 4301-4310; Oct. 2012.

(Continued)

*Primary Examiner* — Emily P Pham
*Assistant Examiner* — Shahzeb K Ahmad (57) ABSTRACT

Embodiments of a circuit for controlling DC offset error for an inductor current ripple based, constant-on time DC-DC converter are disclosed. The circuit includes a ripple generation circuit coupled to a reference voltage input and to a sense voltage input, and having a reference voltage output to form a main loop. The circuit also includes a DC error correction circuit connected between the reference voltage input and the sense voltage input, and the reference voltage output of the ripple generation circuit. The DC error correction circuit includes a coarse DC error correction loop coupled between the sense voltage input and the reference voltage output and a fine DC error correction loop coupled between the reference voltage input and the reference voltage output. A method for controlling DC offset error for an inductor current ripple based, constant-on time DC-DC converter, is also disclosed.

11 Claims, 9 Drawing Sheets

(56) References Cited

U.S. PATENT DOCUMENTS

| | | | |
|---|---|---|---|
| 7,053,595 B1 | 5/2006 | Mei et al. | |
| 7,671,573 B1 | 3/2010 | Ling et al. | |
| 8,334,682 B2* | 12/2012 | Chiu | H02M 1/14 |
| | | | 323/282 |
| 8,446,135 B2 | 5/2013 | Chen et al. | |
| 8,593,125 B1 | 11/2013 | Xue | |
| 9,391,511 B2* | 7/2016 | Yu | H02M 3/156 |
| 2002/0125869 A1 | 9/2002 | Groom et al. | |
| 2005/0017703 A1 | 1/2005 | Walters et al. | |
| 2009/0237049 A1 | 9/2009 | Hachiya et al. | |
| 2011/0291626 A1 | 12/2011 | Murakami | |
| 2012/0139507 A1 | 6/2012 | Ferguson | |
| 2012/0153910 A1 | 6/2012 | Bulzacchelli et al. | |
| 2013/0249524 A1 | 9/2013 | Kujala et al. | |
| 2014/0292288 A1 | 10/2014 | Yan et al. | |
| 2015/0280557 A1 | 10/2015 | Xue et al. | |
| 2017/0077812 A1* | 3/2017 | Guo | H02M 3/158 |

OTHER PUBLICATIONS

U.S. Appl. No. 15/088,957; 30 pages (dated Apr. 1, 2016).
Non Final Office Action for U.S. Appl. No. 15/088,957; 12 pages (dated Mar. 31, 2017).

* cited by examiner

DC OFFSET CORRECTION FOR INDUCTOR CURRENT RIPPLE BASED, CONSTANT-ON-TIME DC-DC CONVERTERS

BACKGROUND

Constant on-time boost converters are known for their fast transient responses, ease of design, smaller and simpler controllers, and elimination of sub-harmonic oscillations. However, there are some drawbacks such as variable switching frequency and also direct current (DC) offset error.

SUMMARY

Embodiments of a DC-DC converter are disclosed. In an embodiment, a circuit for controlling DC offset error for an inductor current ripple based, constant-on time DC-DC converter is disclosed. The circuit includes a ripple generation circuit coupled to a reference voltage input and to a sense voltage input, and having a reference voltage output to form a main loop. The circuit also includes a DC error correction circuit connected between the reference voltage input and the sense voltage input, and the reference voltage output of the ripple generation circuit. The DC error correction circuit includes a coarse DC error correction loop coupled between the sense voltage input and the reference voltage output and a fine DC error correction loop coupled between the reference voltage input and the reference voltage output.

In an embodiment, the coarse DC error correction loop comprises a sample and hold circuit and an operational transconductance amplifier (OTA).

In an embodiment, the fine DC error correction loop comprises a low-pass filter and an OTA. In a further embodiment, the low-pass filter has a time constant that is 10-20 times larger than the switching period, $T_S$.

In an embodiment, an inductor current ripple based, constant-on time DC-DC boost converter includes the above-described circuit.

In an embodiment, an inductor current ripple based, constant-on time DC-DC buck converter includes the above-described circuit.

In an embodiment, the coarse DC error correction loop includes a sample and hold circuit and an OTA and the fine DC error correction loop includes a low-pass filter and an OTA.

In an embodiment, a method for controlling DC offset error for an inductor current ripple based, constant-on time DC-DC converter, is disclosed. The method involves performing inductor current ripple based control via a main loop, performing coarse DC error correction via a coarse DC error correction loop that is coupled to the main loop, and performing fine DC error correction via a fine DC error correction loop that is coupled to the main loop.

In an embodiment, performing inductor current ripple based control via the main loop involves comparing a reference voltage to a sense input voltage to find the difference and generating a reference voltage output in response to the comparison.

In an embodiment, performing coarse DC error correction via a coarse DC error correction loop involves sampling and holding the sense input voltage, generating an output in response to the sampled and held sense input voltage, and adding the output to the reference voltage output.

In an embodiment, performing fine DC error correction via a fine DC error correction loop involves low-pass filtering a feedback voltage, comparing the low-pass filtered feedback voltage to the reference voltage input, generating an output in response to the comparison and adding the output to the reference voltage output.

In an embodiment, an inductor current ripple based, constant-on time DC-DC boost converter is configured to implement the above-described method.

In an embodiment, an inductor current ripple based, constant-on time DC-DC buck converter is configured to implement the above-described.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Constant on-time boost converters are known for their fast transient responses, ease of design, smaller and simpler controllers, and elimination of sub-harmonic oscillations. There are some drawbacks such as variable switching frequency (which may not be attractive for some applications) and also direct current (DC) offset error. In an embodiment in accordance with the invention, DC offset error is addressed in DC-DC converters by canceling the DC offset error without compromising the speed of the DC-DC converter. In an embodiment, two auxiliary loops are added, a first loop being a coarse DC correction loop that provides fast offset correction and addresses a big portion of the offset, and a second loop being a fine DC correction loop that provides slow offset correction and addresses the residual DC offset.

Figure 1A:
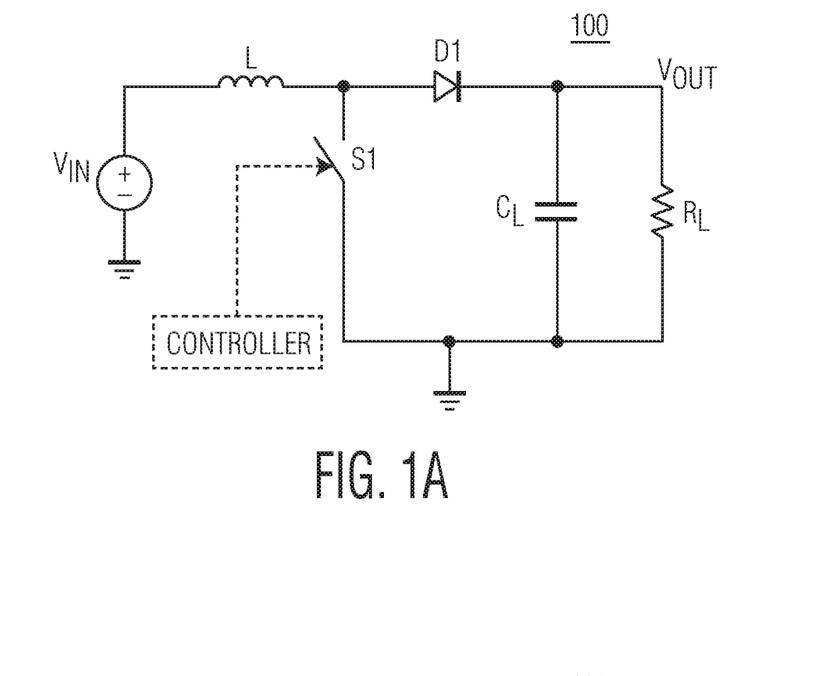
FIG. 1A shows the basic structure of a DC-DC step-up converter, also referred to as a boost converter.
Figure 1B:
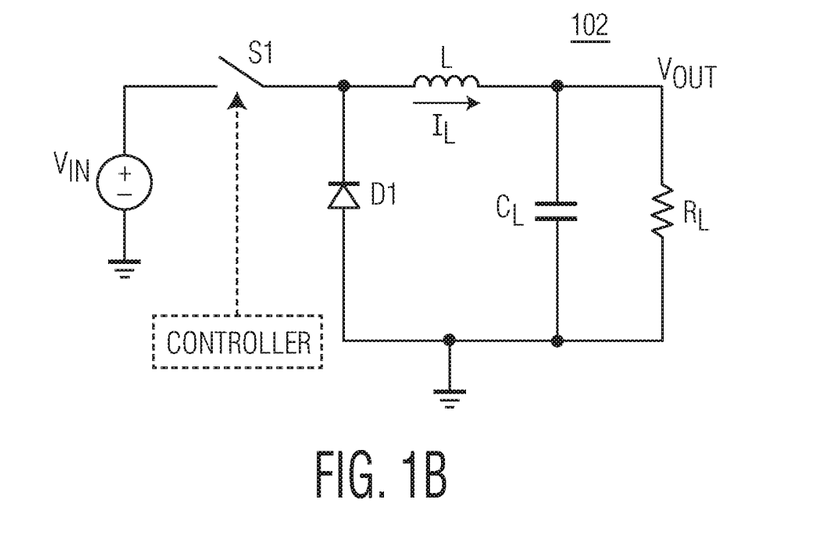
FIG. 1B shows the basic structure of a DC-DC step-down converter, also referred to as a buck converter.

FIG. 1A depicts a basic structure of a DC-DC step-up converter 100, also referred to as a boost converter, and FIG. 1B depicts a basic structure of a DC-DC step-down converter 102, also known as a buck converter. With reference to FIG. 1A, the DC-DC boost converter includes a voltage source, $V_{IN}$, a switch, S1, a controller, a diode, D1, an inductor, L, a capacitor, $C_L$, and a load, identified as a resistor, $R_L$. With reference to FIG. 1B, the DC-DC buck converter includes a voltage source, $V_{IN}$, a switch, S1, a controller, a diode, D1, an inductor, L, a capacitor, $C_L$, and a load, identified as a resistor, $R_L$. In various embodiments of the boost and buck converters, the voltage source may be a battery, the switch may be a PMOS or NMOS switch as is known in the field.

For the boost converter 100 of FIG. 1A, the output voltage could be as low as the input voltage or as high as the components can handle, mathematically there is no limit. For the buck converter 102 of FIG. 1B, in theory the output voltage could be anywhere from ground all the way to the input voltage, however, there are practical limitations to these two extremes. In order to have a regulated output voltage that stays at a desired value regardless of disturbances such as load current or input variations (known as load regulations and line regulations), the controller controls the switch, S1. In some applications, the diode, D1, is replaced with another switch and such controllers are known as synchronous controllers, as opposed to asynchronous controller that utilize a diode.

Regardless of the choice for the diode, D1, there are many choices for the controller. Some controllers provide a fixed switching frequency (known as pulse-width-modulation (PWM)) and utilize either the inductor current or the output/capacitor voltage to regulate the output voltage and fall into the categories of current-mode PWM or voltage-mode PWM controllers. There is a different category of controllers that offers faster dynamic responses compared to current-mode PWM and voltage-mode PWM controllers, which is known as ripple based controllers, or hysteretic controllers, which is a superset of ripple based controllers.

Figure 2A:
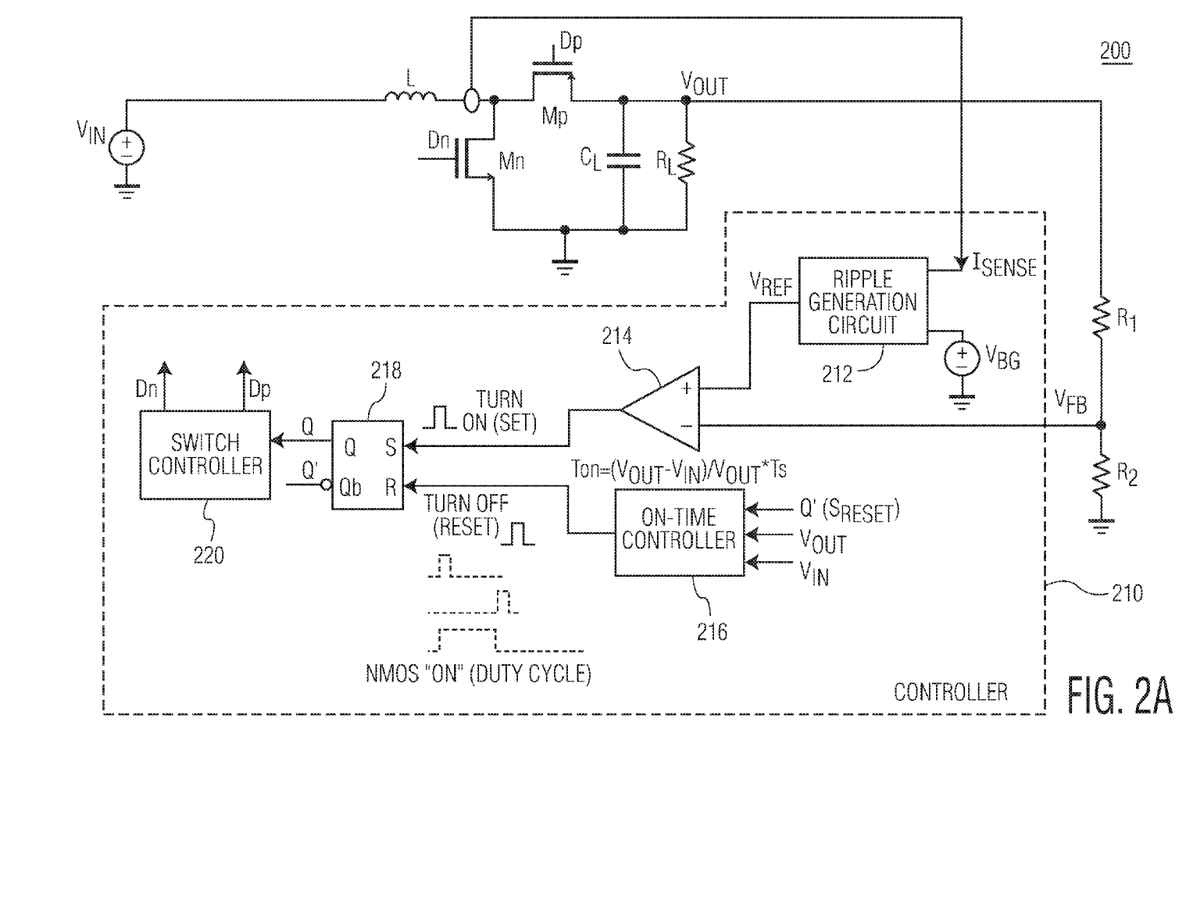
FIG. 2A is one implementation of a constant on-time inductor current ripple based boost converter.
Figure 2B:
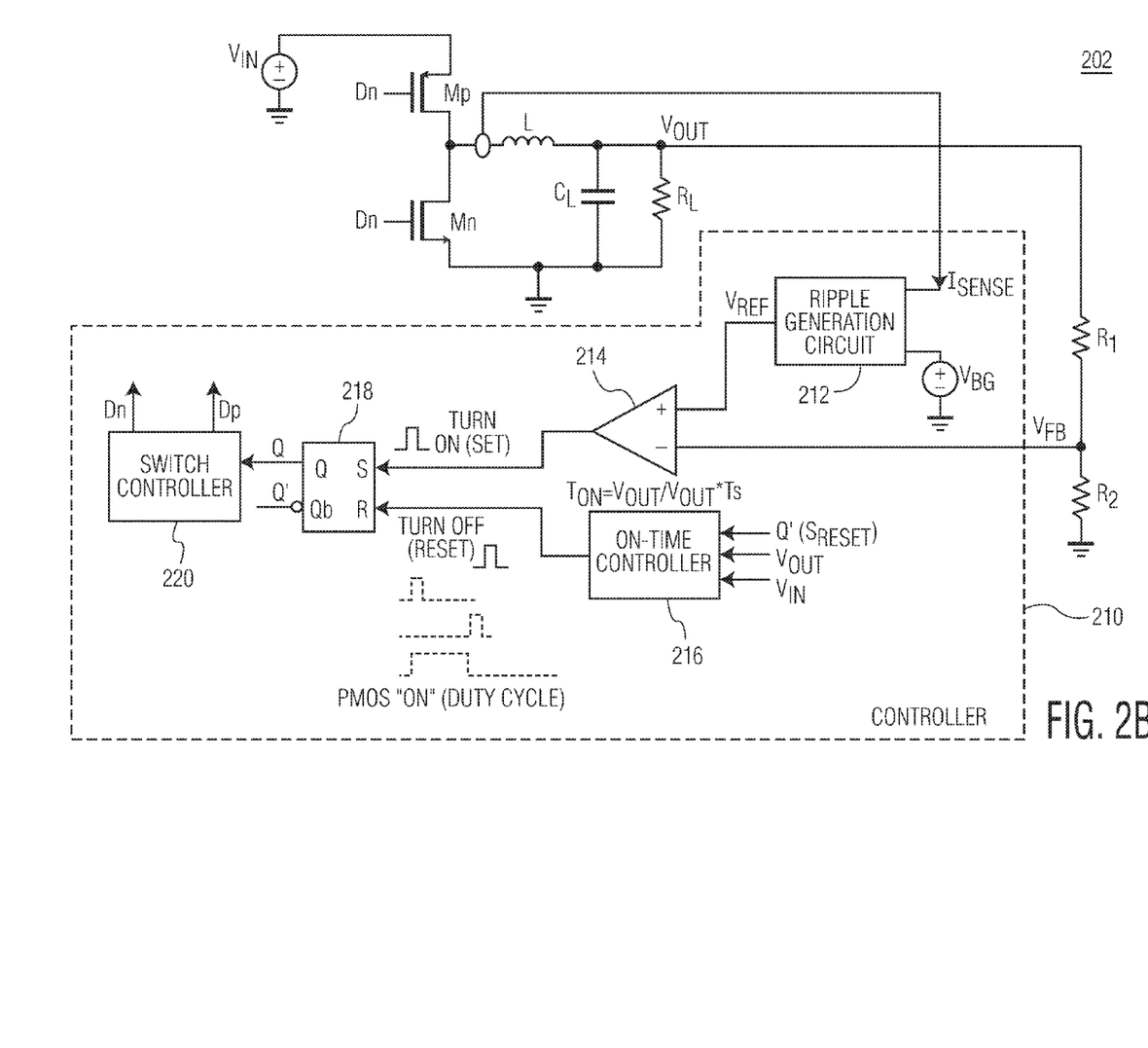
FIG. 2B is one implementation of a constant on-time inductor current ripple based buck converter.

Hysteretic controllers offer many advantages over current-mode PWM and voltage-mode PWM controllers but at the same time are not free of drawbacks. Although hysteretic controllers provide much faster recovery from disturbances to input voltage(s) and load current(s) and have relatively simple designs, hysteretic controllers suffer from DC offset error and variations in the switching frequency. FIG. 2A is one implementation of a known constant on-time inductor current based ripple control boost converter 200 and FIG. 2B is one implementation of a known constant on-time inductor current ripple based buck converter 202. With reference to FIG. 2A, the DC-DC boost converter includes a voltage source, $V_{IN}$, an inductor, L, an NMOS switch, Mn, a PMOS switch, Mp, a capacitor, $C_L$, a load (represented as a resistor), $R_L$, a feedback resistor, $R_1$, a feedback resistor, $R_2$, and a controller 210. The controller includes a ripple generation circuit 212, a comparator 214, an on-time controller 216, an SR latch 218, and a switch controller 220. The DC-DC buck converter of FIG. 2B includes similar elements to those in FIG. 2A. Each of the elements of FIGS. 2A and 2B is known in the field. Operation of both the DC-DC boost and buck converters is described below.

In the case of the boost converter 200 (FIG. 2A), when a turn-on pulse (e.g., a "set" signal) is sent from the comparator 214, it sets the SR latch 218, causing the output of the SR latch, "Q," to go to HIGH. A HIGH Q signal causes the NMOS switch, Mn, to be turned on (i.e., the NMOS switch is closed) and causes the PMOS switch, Mp, to be turned off (i.e., the PMOS switch is open) in response to the respective control signals, Dn and Dp, from the switch controller 220. In the case of the buck converter 202 (FIG. 2B), a HIGH Q signal causes the PMOS switch, Mp, to be turned on (i.e., the PMOS switch is closed) and causes the NMOS switch, Mn, to be turned off (i.e., the NMOS switch is open). In both cases, at this sub-period, the inductor current increases. After a pre-defined "on-time" (e.g., set by design, per specs), the on-time controller 216 sends a turn-off pulse (e.g., a "reset" signal), which resets the SR latch, causing the output of the SR latch, "Q," to change to LOW. In the case of the boost converter, the NMOS switch, Mn, turns off and the PMOS switch, Mp, turns on and for the buck converter, the PMOS switch, Mp, turns off and the NMOS switch, Mn, turns on. In both cases, at this sub-period, the inductor current decreases due to delivering energy to the load (e.g., $R_L$). At some point in time, the reference voltage, $V_{REF}$, exceeds the feedback voltage, $V_{FB}$, (again), and then the comparator sends a new turn-on pulse. The controller keeps providing the turn-on and turn-off signals and the DC-DC converter regulates and provides a desired output voltage.

It is important to note that the sub-period during which the inductor, L, is being energized is fixed for both the boost converter 200 and the buck converter 202, and at steady-state the off time stays relatively constant, so the converter switching frequency does not change. In continuous conduction mode (CCM) for a boost converter, in which the inductor current stays greater than zero all the time, the duty cycle (e.g., the time that the inductor is being energized) is expressed in equation (1) as:

$$D=(V_{OUT}-V_{IN})/V_{OUT} \quad (1)$$

At steady-state, the relationship between the switching period, $T_S$, and the on-time, $T_{ON}$, is expressed in equation (2) as:

$$T_{ON}=((V_{OUT}-V_{IN})/V_{OUT})\cdot T_S \quad (2)$$

In continuous conduction mode (CCM) for a buck converter, in which the inductor current stays greater than zero all the time, the duty cycle (e.g., the time that the inductor is being energized) is expressed in equation (3) as:

$$D=V_{OUT}/V_{IN} \quad (3)$$

At steady-state, the relationship between the switching period, $T_S$, and the on-time, $T_{ON}$, is expressed in equation (4) as:

$$T_{ON}=(V_{OUT}/V_{IN})\cdot T_S \quad (4)$$

Equations (2) and (4) hold for both PWM controllers in steady-state and constant on-time controllers in steady-state, and since the on-time, $T_{ON}$, is proportional to $(V_{OUT}-V_{IN})/V_{OUT}$, and $V_{OUT}/V_{IN}$, respectively, the switching period, $T_S$, becomes a constant value in steady-state. This is how a constant on-time controller generates a switching frequency (constant switching frequency) without the need for a clock. However, in practice, the switching period, $T_S$, exhibits some variations that translate to variations in the switching frequency.

Figure 3:
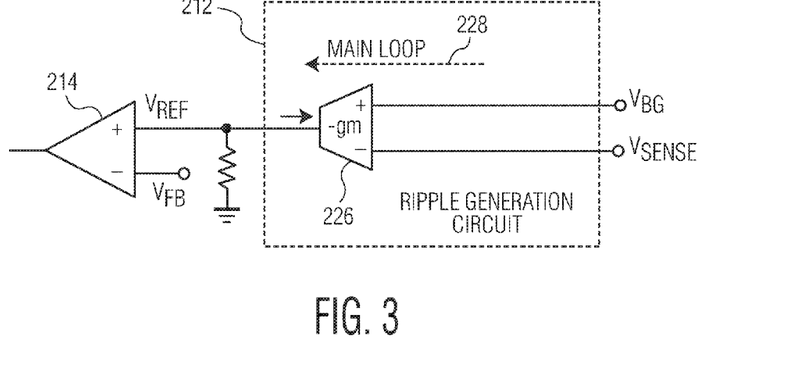
FIG. 3 depicts an embodiment of a ripple generation circuit.

The DC-DC converters 200 and 202 shown in FIGS. 2A and 2B use a ripple generation circuit 212 to control the output voltage. FIG. 3 depicts an expanded view of an embodiment of the ripple generation circuit 212 that includes an operational transconductance amplifier (OTA) 226 (also referred to as a "GM cell"), a reference voltage input (e.g., a band-gap voltage ($V_{BG}$)) to the OTA, a sense voltage input ($V_{SENSE}$) to the OTA, and a reference voltage output ($V_{REF}$) from the OTA that form a main loop 228. In operation, the inductor current ($I_L$) is sensed to provide a proper current ($I_{SENSE}$) (represented as voltage ($V_{SENSE}$)) ripple and equation (5) shows the relationship between the inductor current ($I_L$) and the sensed current ($I_{SENSE}$) (represented as $V_{SENSE}$), where $G_I$ is the current sensing gain.

$$V_{SENSE}=G_I\cdot I_L \quad (5)$$

In this implementation and scheme, the inductor current ($I_L$) is sensed and the output, $V_{SENSE}$ (sensed as $I_{SENSE}$), is compared to the reference voltage input, $V_{BG}$, at the OTA 226 to find the voltage difference and generate the reference voltage output, $V_{REF}$. The reference voltage output, $V_{REF}$, is then compared with the feedback voltage, $V_{FB}$, at the comparator 214 of the controller 210 to provide the turn-on pulse to the SR latch 218.

Figure 4:
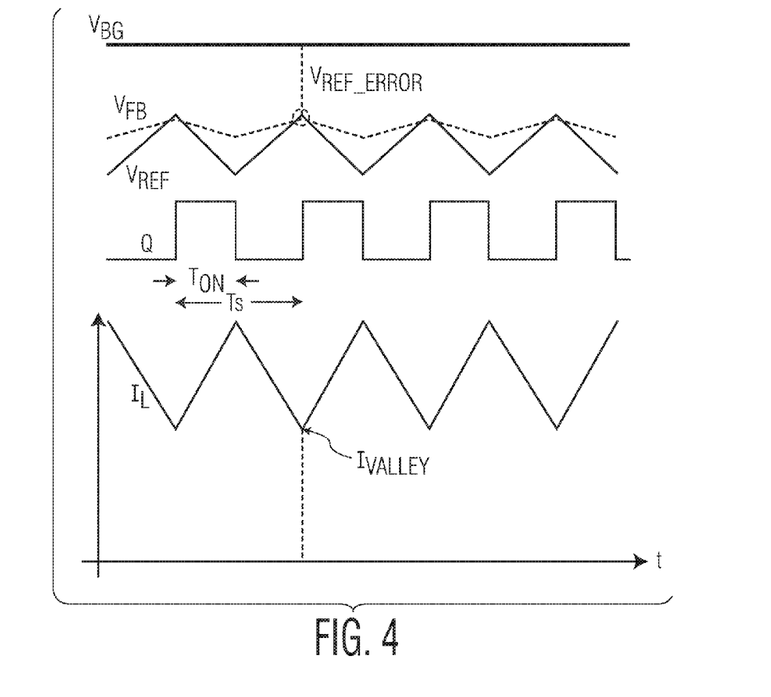
FIG. 4 depicts the waveforms of the reference voltage input, $V_{BG}$, the feedback voltage, $V_{FB}$, the reference voltage output, $V_{REF}$, the SR latch output, Q, and the inductor current, $I_L$, in continuous conduction mode and steady-state operation using the circuits of FIGS. 2A or 2B and 3.

FIG. 4 depicts the waveforms of the reference voltage input, $V_{BG}$, the feedback voltage, $V_{FB}$, the reference voltage output, $V_{REF}$, the SR latch output, Q, and the inductor current, $I_L$, in continuous conduction mode and steady-state operation using the circuits described with reference to FIGS. 2A or 2B and 3. Since the inductor current, $I_L$, has a DC component, the minimum inductor current, $I_{VALLEY}$, changes at different load currents. Therefore, the maximum value of the reference voltage output, $V_{REF}$, deviates from the reference voltage input, $V_{BG}$, by the DC offset error, $V_{REF\_ERROR}$, as shown in FIG. 4. This deviation causes DC offset error at the output voltage, $V_{OUT}$, for different load currents, and equation (6) shows the relationship between the DC offset error, $V_{REF\_ERROR}$, and the minimum inductor current, $I_{VALLEY}$.

$$V_{REF\_ERROR}=G_I\cdot I_{VALLEY} \quad (6)$$

Figure 5:
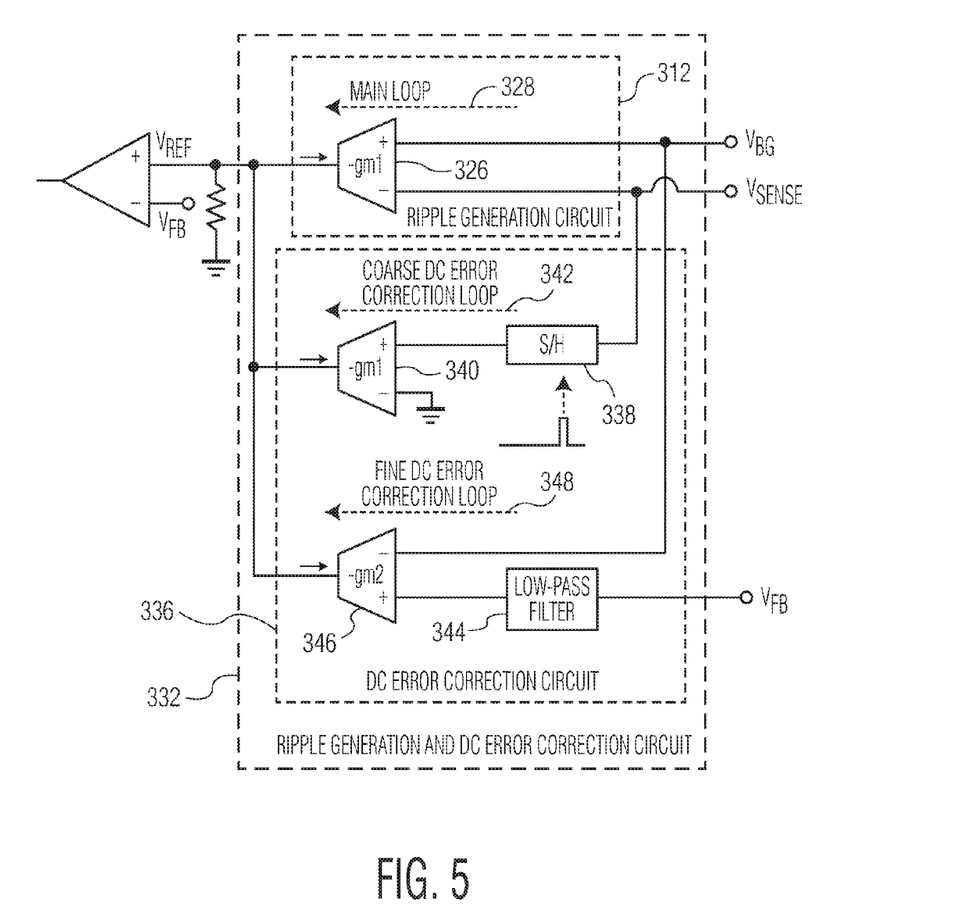
FIG. 5 depicts an embodiment of a ripple generation and DC error correction circuit that includes a ripple generation circuit and a DC error correction circuit.

In an embodiment in accordance with the invention, two auxiliary loops are added to the ripple generation circuit, a coarse DC correction loop that provides fast offset correction and a fine DC correction loop that provides slow offset correction and addresses the residual DC offset. FIG. 5 depicts an embodiment of a ripple generation and DC error correction circuit 332 that includes a ripple generation circuit 312 and a DC error correction circuit 336 configured to provide inductor current ripple based control and to remove DC offset error in accordance with an embodiment of the invention. The ripple generation circuit 312 is similar to the ripple generation circuit 212 described with reference to FIG. 3 and includes an OTA 326 that forms part of a main loop 328. The ripple generation circuit includes the OTA, a reference voltage input (e.g., a band-gap voltage ($V_{BG}$)) to the OTA, a sense voltage input, $V_{SENSE}$, to the OTA, and a reference voltage output, $V_{REF}$, from the OTA. The DC error correction circuit is connected between the reference voltage input, $V_{BG}$, and the sense voltage input, $V_{SENSE}$, and the reference voltage output, $V_{REF}$, of the ripple generation circuit. The DC error correction circuit includes a sample and hold (S/H) circuit 338 and an OTA 340 that are part of a coarse DC error correction loop 342 (also referred to as the "fast" DC error correction loop), and a low-pass filter 344 and an OTA 346 that are part of a fine DC error correction loop 348 (also referred to as the "slow" DC error correction loop). As shown in FIG. 5, the coarse DC error correction loop is coupled between the sense voltage input, $V_{SENSE}$, and the reference voltage output, $V_{REF}$, and the fine DC error correction loop is coupled between the reference voltage input, $V_{BG}$, and the reference voltage output, $V_{REF}$. In an embodiment, the sample and hold circuit includes a hold-capacitor (not shown). The coarse DC error correction loop and the fine DC error correction loop help to correct DC offset error (e.g., cancel the DC offset error) while preserving the fast dynamic behavior of the ripple-based DC-DC converter.

The sample and hold circuit 338 in the coarse DC error correction loop 342 is used to sample the minimum of the sense current, $I_{SENSE}$ (represented as $V_{SENSE}$), and holds the sampled value for the remainder of the switching period, $T_S$, which is a delicate task that needs to be done at the proper moment. In an embodiment, the proper moment is at the inductor current valley ($I_{VALLEY}$) as shown in FIG. 4. In operation, the sampled and held value for each switching period, $T_S$, is applied to the OTA 340 and the output voltage is added in real time (e.g., immediately, with no wait) to the reference voltage output, $V_{REF}$. Since the sampled and held value is updated each switching period, $T_S$, the coarse DC correction loop updates the reference voltage output, $V_{REF}$, every switching period, $T_S$, and does not affect the dynamic response of the main loop 328. The course DC correction loop provides a relatively fast correction of the DC offset error.

Figure 6A:
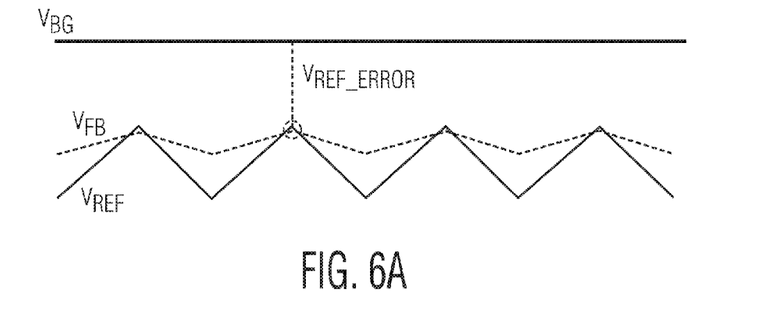
FIG. 6A depicts waveforms of the reference voltage input, $V_{BG}$, the feedback voltage, $V_{FB}$, and the reference voltage output, $V_{REF}$, when only a main loop is engaged.
Figure 6B:
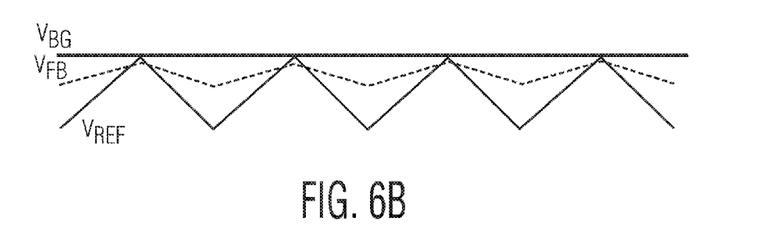
FIG. 6B depicts the waveforms of FIG. 6A when the main loop and a coarse DC error correction loop are engaged.
Figure 6C:
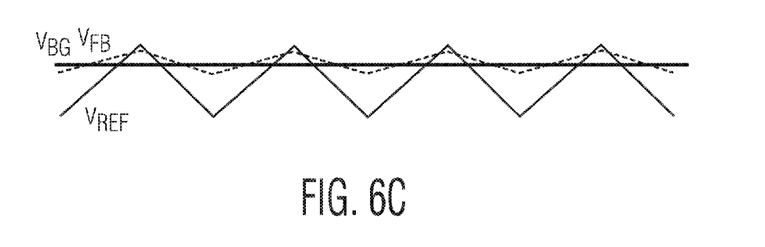
FIG. 6C depicts the waveforms of FIG. 6A when the main loop, the coarse DC correction loop, and a fine DC correction loop are engaged.

FIGS. 6A-6C depict waveforms of the reference voltage input, $V_{BG}$, the feedback voltage, $V_{FB}$, and the reference voltage output, $V_{REF}$, in continuous conduction mode and steady-state operation in different cases as are described below. FIG. 6A depicts the reference voltage input, $V_{BG}$, the feedback voltage, $V_{FB}$, and the reference voltage output, $V_{REF}$, when only the main loop 328 (FIG. 5) is engaged and there is no DC offset error correction. FIG. 6B depicts the waveforms when the main loop 328 and the coarse DC error correction loop 342 are engaged. As illustrated in FIG. 6B, the coarse DC error correction loop reduces the DC offset error significantly, but the DC offset error is not completely eliminated. Some residual DC offset error remains due to the fact that the timing of the sample and hold operation is not perfect and also due to droop in the hold-capacitor of the sample and hold circuit.

The fine DC error correction loop 348 as shown in FIG. 5 is used to reduce the residual DC offset error, e.g., to zero. In an embodiment, the low-pass filter 344 has a time constant that is much larger than the switching period, $T_S$. For example, with a switching period, $T_S$=333 ns, the time constant is about twenty times $T_S$. In an embodiment, the time constant is 10-50 times the switching period, $T_S$, and in another embodiment, the time constant is 10-20 times the switching period, $T_S$. In operation, the feedback voltage, $V_{FB}$, is fed into the low-pass filter and then to the OTA 346. The reference voltage input, $V_{BG}$, and the output from the low-pass filter are input to the OTA and the output is added to the reference voltage output, $V_{REF}$. By utilizing the feedback voltage, $V_{FB}$, the residual DC offset error is reduced to zero (or nearly zero, e.g., ±2%). FIG. 6C depicts the waveforms of the reference voltage input, $V_{BG}$, the feedback voltage, $V_{FB}$, and the reference voltage output, $V_{REF}$, when the main loop 328, the coarse DC correction loop 342, and the fine DC correction loop 348 are engaged. The addition of the fine DC correction loop does not affect the dynamics of the converter and in fact the fine DC correction loop specifically addresses the residual DC offset error leftover from the coarse DC correction loop. In an embodiment, the OTA 346 used in the fine DC correction loop is configured to consume much less power than the OTA 326 used in the main loop or the OTA 340 used in the coarse DC correction loop. For example, the OTA used in the fine DC correction loop uses less biasing current and outputs a small current compared to the main loop and the course DC correction loop. When there is a disturbance to the converter, the coarse DC correction loop responds within one switching cycle (e.g., relatively fast DC error correction) and reduces the DC offset error right away, but the fine DC correction loop takes a few cycles (e.g., relatively slow DC error correction) to respond to the disturbance and eliminate the residual DC offset error. Neither one of the two DC error correction loops are in charge of the converter's dynamics, which are controlled through the main loop. In an embodiment, residual DC offset error is eliminated when the output voltage is within ±2% of the desired target. In an embodiment, an output voltage of 5V is the target and using the ripple generation and DC error correction circuit 332 as described above, the actual output voltage stays within ±2% of the target.

Figure 7A:
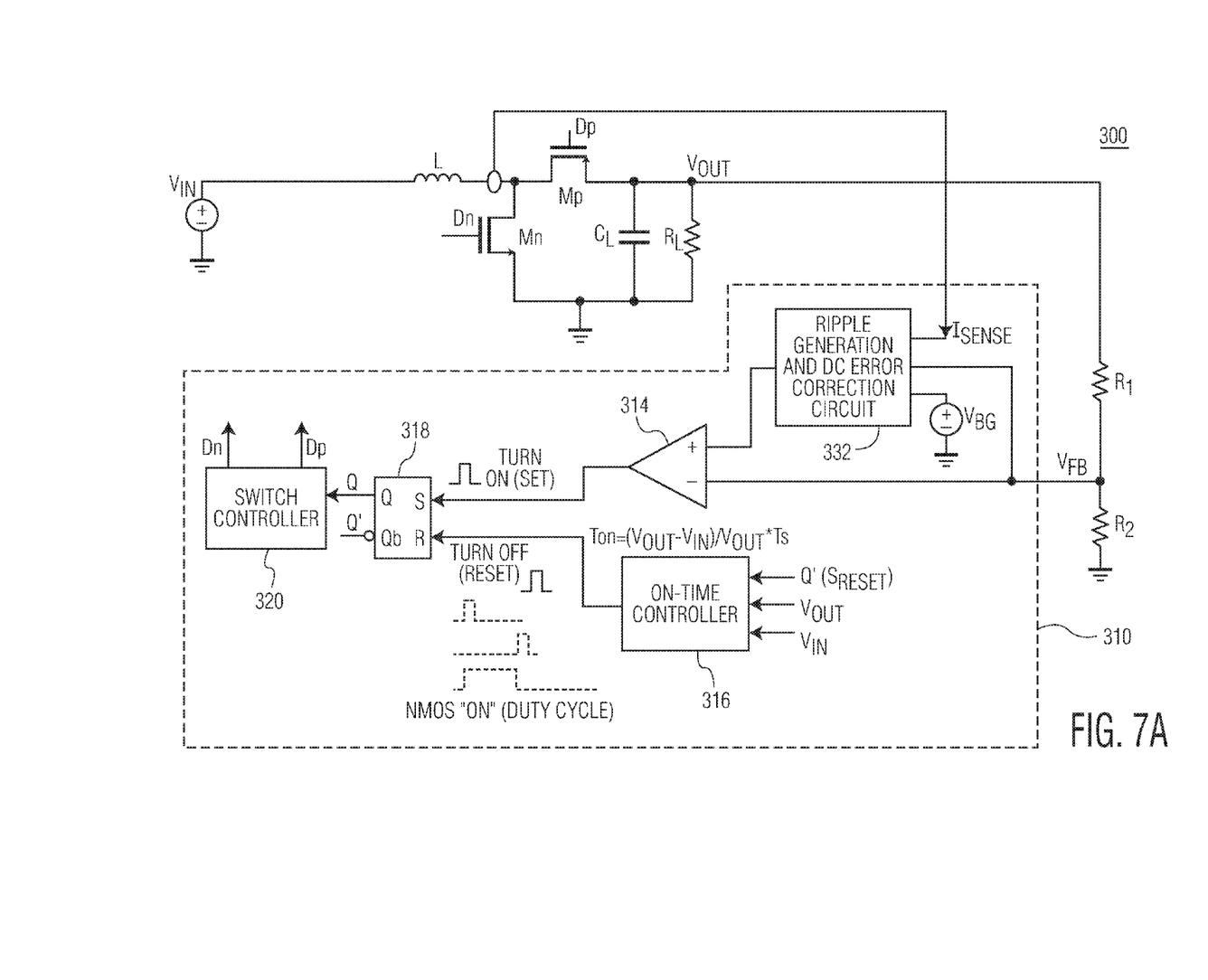
FIG. 7A depicts an embodiment of a DC-DC boost converter with an inductor current ripple based controller that is similar to the DC-DC boost converter depicted in FIG. 2A except that the DC-DC boost converter depicted in FIG. 7A includes a DC error correction circuit as described above with reference to FIGS. 5 and 6C.

FIG. 7A depicts an embodiment of a DC-DC boost converter 300 with an inductor current ripple based controller 310 that is similar to the DC-DC boost converter 200 depicted in FIG. 2A except that the DC-DC boost converter depicted in FIG. 7A includes a DC error correction circuit 336 as described above with reference to FIGS. 5 and 6C. The DC error correction circuit includes a coarse DC error correction circuit loop 342 configured to perform coarse DC error correction via the coarse DC error correction loop and a fine DC error correction loop 348 configured to perform fine DC error correction via the fine DC error correction loop. The DC-DC boost converter depicted in FIG. 7A demonstrates fast responses to line and load disturbances and has little to no DC offset error.

Figure 7B:
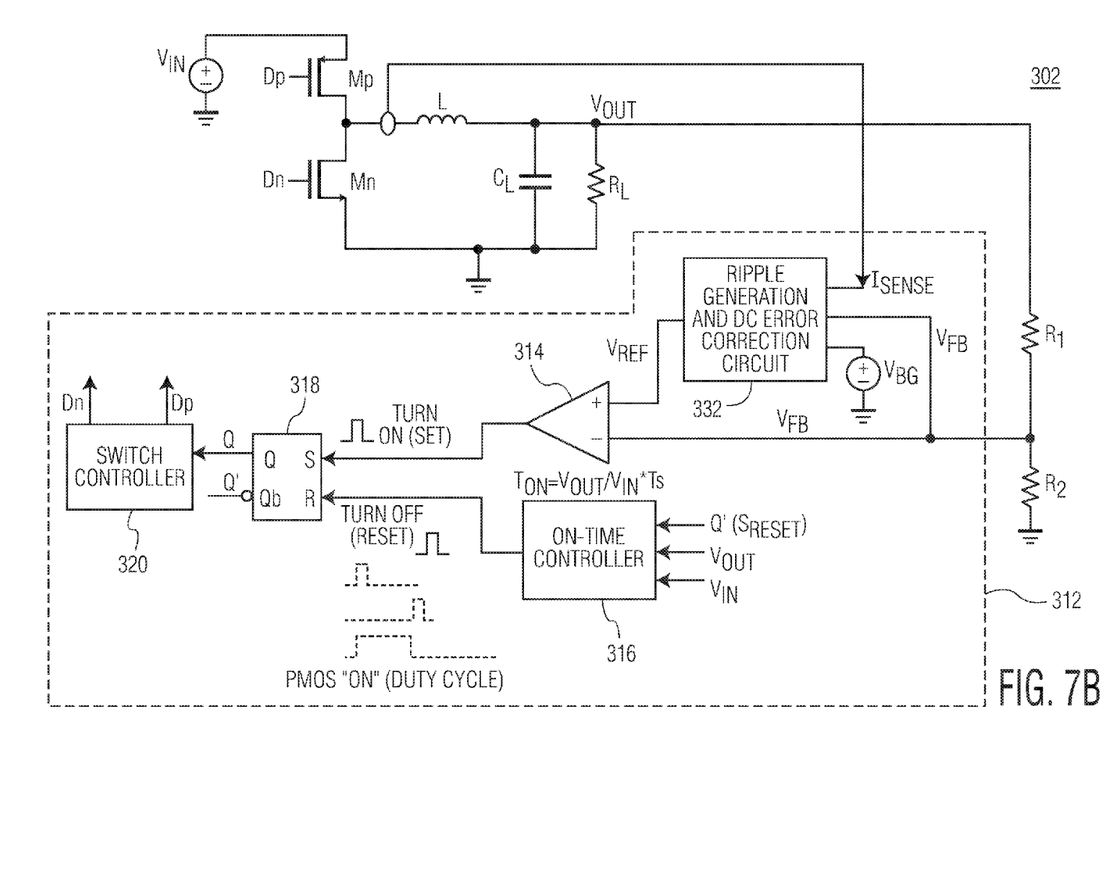
FIG. 7B depicts an embodiment of a DC-DC buck converter with an inductor current ripple based controller that is similar to the DC-DC buck converter depicted in FIG. 2B except that the DC-DC buck converter depicted in FIG. 7B includes a DC error correction circuit as described above with reference to FIGS. 5 and 6C.

FIG. 7B depicts an embodiment of a DC-DC buck converter 302 with an inductor current ripple based controller 312 that is similar to the DC-DC buck converter 202 depicted in FIG. 2B except that the DC-DC buck converter depicted in FIG. 7B includes a DC error correction circuit 336 as described above with reference to FIGS. 5 and 6C. The DC error correction circuit includes a coarse DC error correction circuit loop 342 configured to perform coarse DC error correction via the coarse DC error correction loop and a fine DC error correction loop 348 configured to perform fine DC error correction via the fine DC error correction loop. The DC-DC buck converter depicted in FIG. 7B demonstrates fast responses to line and load disturbances and has little to no DC offset error.

Figure 8:
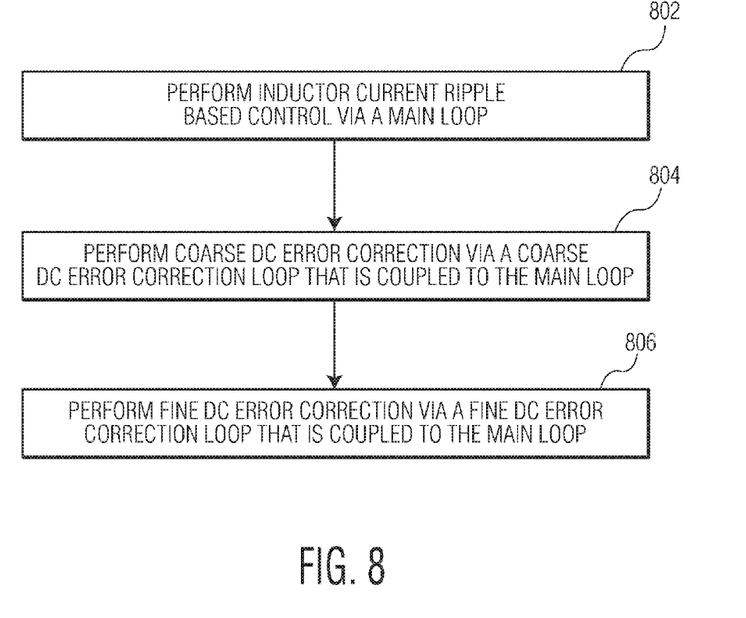
FIG. 8 is a flow diagram of a method for controlling DC offset error for an inductor current ripple based, constant-on time DC-DC converter, such as the boost and buck converters described above with reference to FIGS. 5, 6C, 7A, and 7B.

FIG. 8 is a flow diagram of a method for controlling DC offset error for an inductor current ripple based, constant-on time DC-DC converter, such as the boost and buck converters described above with reference to FIGS. 5, 6C, 7A, and 7B. At block 802, inductor current ripple based control is performed via a main loop. For example, performing inductor current ripple based control via a main loop involves comparing a reference voltage ($V_{BG}$) to a sense input voltage ($V_{SENSE}$) to find the voltage difference and generating a reference voltage output ($V_{REF}$) in response to the resulting voltage difference. At block 804, coarse DC error correction is performed via a coarse DC error correction loop that is coupled to the main loop. For example, performing coarse DC error correction via a coarse DC error correction loop comprises sampling and holding the sense input voltage ($V_{SENSE}$), generating an output in response to the sampled and held sense input voltage, and adding the output to the reference voltage output ($V_{REF}$). At block 806, fine DC error correction is performed via a fine DC error correction loop that is coupled to the main loop. For example, performing fine DC error correction via a fine DC error correction loop comprises low-pass filtering a feedback voltage ($V_{FB}$), comparing the low-pass filtered feedback voltage ($V_{FB}$) to the reference voltage input ($V_{BG}$), generating an output in response to the comparison and adding the output to the reference voltage output ($V_{REF}$).

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A circuit for controlling DC offset error for an inductor current ripple based, constant-on time DC-DC converter, the circuit comprising: a ripple generation circuit coupled to a reference voltage input and to a sense voltage input, and having a reference voltage output to form a main loop; and a DC error correction circuit external to the ripple generation circuit and connected between the reference voltage input and the sense voltage input, and the reference voltage output of the ripple generation circuit, the DC error correction circuit including: a coarse DC error correction loop coupled between the sense voltage input and the reference voltage output such that an output of the coarse DC error correction loop is added to the reference voltage output: a fine DC error correction loop coupled between the reference voltage input and the reference voltage output such that an output of the fine DC error correction loop is also added to the reference voltage output; wherein the coarse DC error correction loop comprises a sample and hold circuit and an operational transconductance amplifier (OTA), wherein a sampled and held value of the sense voltage input for each switching period, $T_S$, is applied to the OTA and the output voltage of the OTA is added to the reference voltage output.

2. The circuit of claim 1, wherein the fine DC error correction loop comprises a low-pass filter and an operational transconductance amplifier (OTA), wherein a feedback voltage of the inductor current ripple based, constant-on time DC-DC converter is fed into the low-pass filter and then to the OTA and the reference voltage input is fed into the OTA, and the output of the OTA is added to the reference voltage output.

3. The circuit of claim 2, wherein the low-pass filter has a time constant that is 10-20 times larger than a switching period, $T_S$.

4. An inductor current ripple based, constant-on time DC-DC boost converter comprising the circuit of claim 1.

5. An inductor current ripple based, constant-on time DC-DC buck converter comprising the circuit of claim 1.

6. The circuit of claim 1, wherein the low-pass filter has a time constant that is 10-20 times larger than the switching period, $T_S$.

7. An inductor current ripple based, constant-on time DC-DC boost converter comprising the circuit of claim 6.

8. An inductor current ripple based, constant-on time DC-DC buck converter comprising the circuit of claim 6.

9. A method for controlling DC offset error for an inductor current ripple based, constant-on time DC-DC converter, the method comprising:
performing inductor current ripple based control via a main loop;
performing coarse DC error correction via a coarse DC error correction loop that is coupled to the main loop; and
performing fine DC error correction via a fine DC error correction loop that is coupled to the main loop;
wherein performing inductor current ripple based control via a main loop comprises comparing a reference voltage to a sense input voltage to find a voltage difference and generating a reference voltage output in response to the comparison;
wherein performing coarse DC error correction via a coarse DC error correction loop comprises sampling and holding the sense input voltage, generating an output in response to the sampled and held sense input voltage, and adding the output to the reference voltage output; and
wherein performing fine DC error correction via a fine DC error correction loop comprises low-pass filtering a feedback voltage, comparing the low-pass filtered feedback voltage to the reference voltage input, generating an output in response to the comparison and adding the output to the reference voltage output.

10. An inductor current ripple based, constant-on time DC-DC boost converter configured to implement the method claim 9.

11. An inductor current ripple based, constant-on time DC-DC buck converter configured to implement the method of claim 9.

* * * * *